United States Patent [19]

Ikari

[11] Patent Number: 5,794,084
[45] Date of Patent: Aug. 11, 1998

[54] CAMERA

[75] Inventor: Hideo Ikari, Kawasaki, Japan

[73] Assignee: Canon Kabushiki Kaisha, Tokyo, Japan

[21] Appl. No.: 787,146

[22] Filed: Jan. 22, 1997

[30] Foreign Application Priority Data

Jan. 30, 1996 [JP] Japan ................... 8-013729
Jan. 30, 1996 [JP] Japan ................... 8-014169

[51] Int. Cl.$^6$ ............................ G03B 15/03
[52] U.S. Cl. ........................... 396/178; 396/448
[58] Field of Search ............... 396/176–178, 396/448

[56] References Cited

U.S. PATENT DOCUMENTS 4,983,998   1/1991   Hirohata et al. ............. 396/448
5,337,105   8/1994   Vaynshteyn .................. 396/178
5,485,234   1/1996   Stephenson, III et al. ..... 396/178

FOREIGN PATENT DOCUMENTS 3296029  12/1991   Japan.
  41625   1/1992   Japan.
 470637   3/1992   Japan.

*Primary Examiner*—David M. Gray
*Attorney, Agent, or Firm*—Robin, Blecker & Daley

[57] ABSTRACT

A camera comprises a movable unit, such as a cover and a flash emitting part for flash photography, movable relative to a camera body, for protecting a photographing optical system, an urging member for urging the movable unit, and a resistance member for exerting resistance to a movement of the movable unit caused by an urging force of the urging member, so that the movable unit moves slowly. With its simple construction, the camera gives a good feel to a user during use.

33 Claims, 10 Drawing Sheets

CAMERA

BACKGROUND OF THE INVENTION

1. Field of the Invention

This invention relates to a camera and, more particularly to a camera having a movable unit, such as a barrier openable and closable for covering a photographing optical system, and a movable flash emitting device.

2. Description of Related Art

Cameras having a movable unit openable and closable relative to a camera body are disclosed in Japanese Laid-open Patent Application No. Sho 56-87029 and Japanese Laid-open Utility Model Application No. Sho 56-23926. According to these disclosures, the cameras are provided with a movable unit closable to function as a lens cover and openable to uncover the lens and having a flash emitting part built therein and usable when the movable unit is opened.

A variety of cameras have also been proposed which have a relatively small-sized movable unit, in which a flash emitting part pops up automatically from the camera body with the assistance of a spring or the like.

If a relatively large movable unit, such as the lens cover having a flash emitting part built therein or a back cover, is arranged to automatically open and close with the assistance of a spring or the like, however, the movable unit is abruptly flipped open, possibly damaging a hinge that pivotally supports the movable unit. Furthermore, such a flip motion of the movable unit degrades a sense of high quality and reliability required of a camera.

BRIEF SUMMARY OF THE INVENTION

According to one aspect of the present invention, there is provided a camera comprising a cover movable relative to a camera body, for protecting a photographing optical system, urging means for urging the cover, and resistance means for exerting resistance to a movement of the cover caused by an urging force of the urging means, so that the cover moves slowly. The movable cover for protecting the photographing optical system is thus moved slowly. With its simple construction, a smooth feel of the camera is thus provided during use.

According to another aspect of the present invention, there is provided a camera comprising a flash emitting part movable relative to a camera body, for flash photography, urging means for urging the flash emitting part, and resistance means for exerting resistance to a movement of the flash emitting part caused by an urging force of the urging means, so that the flash emitting part moves slowly. The movable flash emitting part is thus moved slowly. With its simple construction, a smooth feel of the camera is thus provided during use.

According to a further aspect of the present invention, there is provided a camera comprising a movable unit movable relative to a camera body, urging means for urging the movable unit, resistance means for exerting resistance to a movement of the movable unit caused by an urging force of the urging means, so that the movable unit moves slowly, and restraining means for restraining the resistance from acting on the movable unit. The unit movable relative to the camera body is thus allowed to move in accordance with the situation at hand as a user intends. With its simple construction, a good feel of the camera is thus provided during use.

DETAILED DESCRIPTION OF THE INVENTION (First Embodiment)

Figure 5:
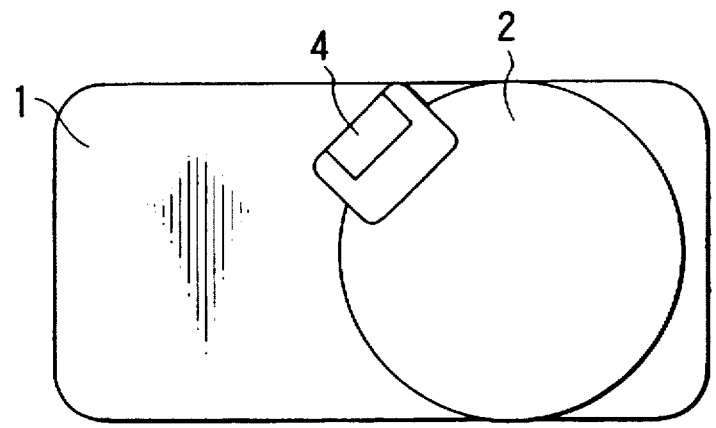
FIG. 5 is a front view of the camera (with the barrier closed).
Figure 6:
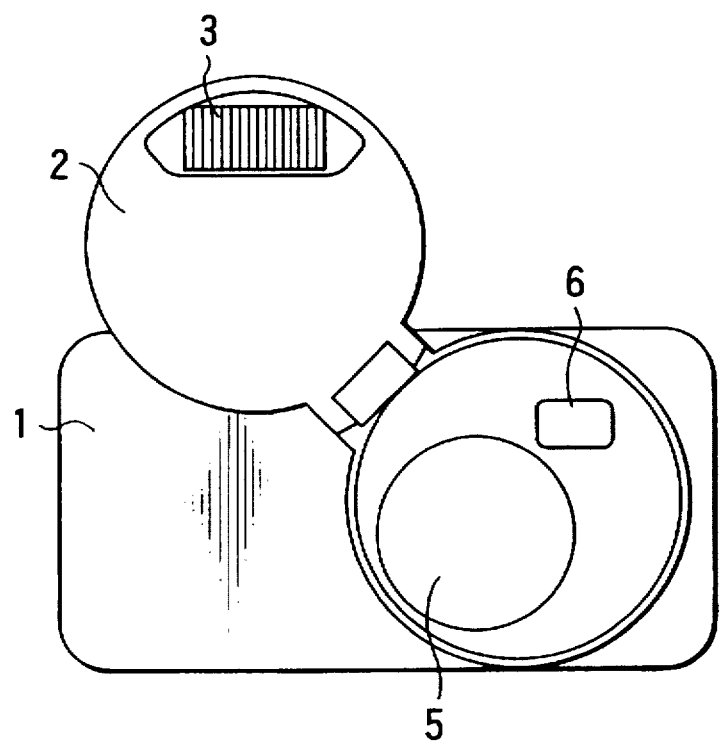
FIG. 6 is a front view of the camera (with the barrier opened).

FIGS. 5 and 6 show the appearance of a camera according to a first embodiment of the present invention. Referring to FIGS. 5 and 6, a camera body 1 is provided with a barrier 2. The barrier 2 has on its rear side a flash emit ting part 3. The barrier 2 is pivotally supported about a hinge 4 to be opened or closed. FIG. 5 shows the barrier 2 in its closed state, and FIG. 6 shows the barrier 2 in its opened state. The flash emitting part 3 is disposed apart as much as possible from a photographing lens with the barrier 2 opened so that the so-called red-eye phenomenon is mitigated.

Figure 1:
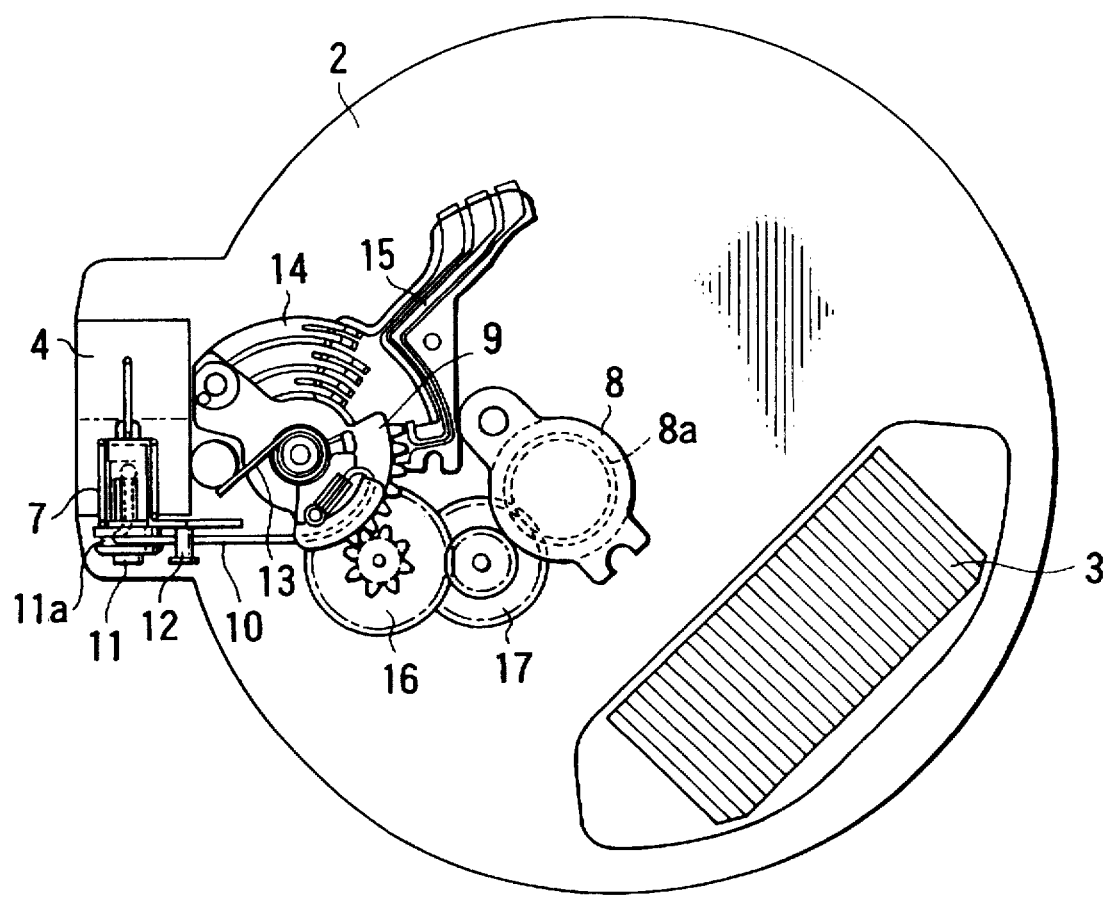
FIG. 1 is an internal view of a barrier (in its closed state) used in the camera according to a first embodiment of the present invention.

There are also shown a photo graphing lens unit 5 and a viewfinder 6. As shown in FIG. 1, the barrier 2 is constantly urged by a spring 7 in the direction of opening, and is locked by a known lock claw (not shown) in its closed state. When the camera is used, the lock claw is unlocked, allowing the barrier 2 to be opened by the urging force of the spring 7.

As is understood from FIGS. 5 and 6, the barrier 2 is relatively large for the size of the camera body 1. If the barrier 2 is of such a simple construction that the barrier 2 is solely opened by the urging of the spring 7, it may be flipped open too abruptly, possibly damaging the hinge 4. Even if it does not damage the hinge 4, such a flip motion degrades a sense of high quality and reliability required of a camera.

Figure 2:
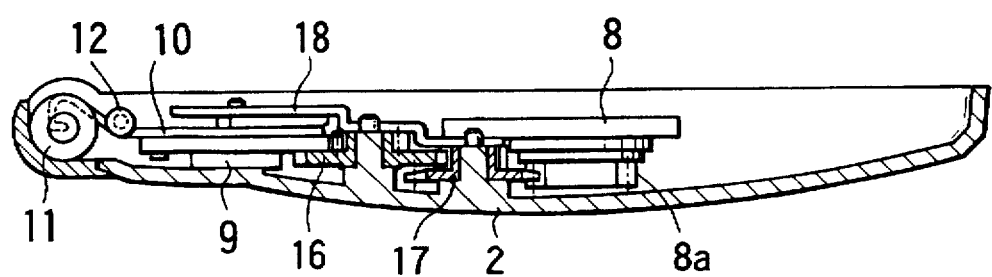
FIG. 2 is an expanded cross-sectional side view of the barrier (in its closed state).

In this embodiment, the internal arrangement of the barrier 2 is constructed as shown in FIGS. 1 and 2. Incidentally, FIG. 2 is an expanded cross-sectional side view of the arrangement shown in FIG. 1. Referring to FIGS. 1 and 2, a damper 8 has a gear portion 8a, which is rotatable relative to a body of the damper 8. The body of the damper 8 accommodates a viscous material presenting a viscosity resistance to the rotation of the gear portion 8a.

One end of a linkage lanyard 10 is fixed to a wind-up gear 9. When the wind-up gear 9 turns counterclockwise in FIG. 1, the linkage lanyard 10 is wrapped around the wind-up gear 9, and when the wind-up gear 9 turns clockwise, the linkage lanyard 10 is paid out from the wind-up gear 9.

The hinge 4 has a supporting shaft 11, which is fixed to the camera body 1. Attached around the circumference of the supporting shaft 11 is a torsion spring 7, which urges the barrier 2 in the direction of opening.

The supporting shaft 11 has on its end a guide groove 11a. The other end of the linkage lanyard 10 is routed along the guide groove 11a and fixed to the supporting shaft 11.

A guide roller 12 guides the linkage lanyard 10 straight to the wind-up gear 9 from the supporting shaft 11. A second torsion spring 13 urges the wind-up gear 9 counterclockwise in FIG. 1.

Contact pieces 14 which are attached to the gear 9 slide on a circuit board 15 secured on the barrier 2, while turning together with the wind-up gear 9. The contact pieces 14 are used to detect the angle of rotation of the wind-up gear 9, namely, the opened or closed position of the barrier 2, through a circuit (not shown).

Two-step-shaped reduction gears 16 and 17 allow the gear portion 8a of the damper 8 to engage with the wind-up gear 9 at an appropriate gear ratio, thereby increasing a small resistance generated in the damper 8 to a sufficient level for the barrier 2 and transferring it to the wind-up gear 9.

In FIG. 2, there is shown a holding plate 18, while in FIG. 1 the holding plate 18 is omitted from being shown, so as to facilitate understanding the structure of the gears 16 and 17, etc.

Figure 3:
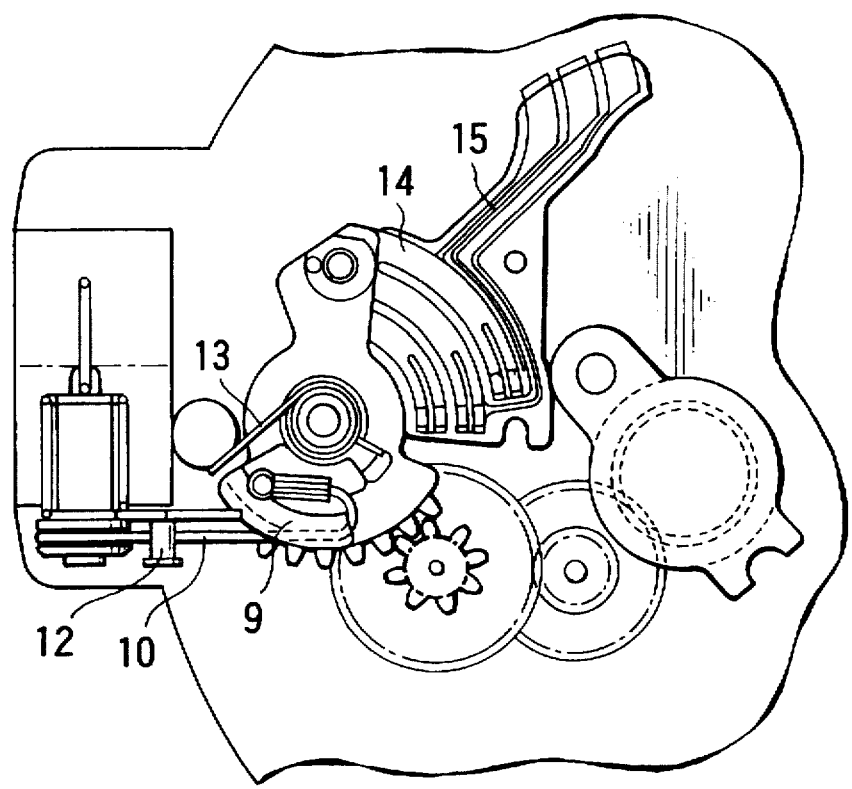
FIG. 3 is an enlarged, fragmentary internal view of the barrier (in its opened state).
Figure 4:
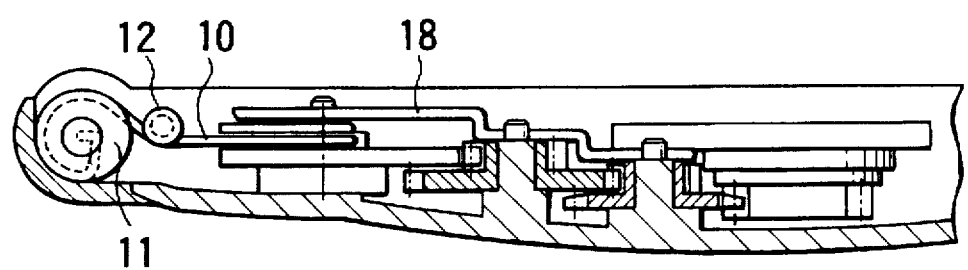
FIG. 4 is an expanded cross-sectional side view of the barrier (in its opened state).

Operation of the camera thus constructed is now discussed. When the barrier 2 in its closed state (as shown in FIGS. 2 and 5) is unlocked, the barrier 2 is driven to its opened state (as shown in FIGS. 4 and 6) by the urging force of the spring 7. In the course of this action, as the barrier 2 pivots about the supporting shaft 11 (clockwise in FIGS. 2 and 4), the linkage lanyard 10 is being wrapped about the bottom surface portion of the guide groove 11a of the supporting shaft 11. Incidentally, FIG. 4 is an expanded cross-sectional side view of the arrangement shown in FIG. 3.

The wind-up gear 9 turns clockwise in FIG. 1 as the linkage lanyard 10 is wrapped about the shaft 11. The turning of the wind-up gear 9 meets the rotation resistance generated by the damper 8 through the intermediate gears 16 and 17. Accordingly, the opening operation of the barrier 2 is slowly performed, and the hinge 4 is thus free from damage and a sense of high quality and reliability is not degraded.

If the damper 8 generates a sufficiently large resistance, the reduction gears 16 and 17 may be dispensed with.

When the barrier 2 is opened approximately 180° as shown in FIG. 6, the barrier 2 is brought into abutment with the camera body 1 and stops there. Abutment portions may be formed on the barrier 2 and the camera body 1 so that the barrier 2 stops at a predetermined position (where the projection range of the flash emitting part 3 remains constant, for example). FIGS. 3 and 4 show the locations of the components of the barrier 2 which is in the fully opened state.

Where the barrier 2 is to be closed after completion of photographing, the user is only required to simply press by hand the barrier 2 against the urging force of the spring 7. When the barrier 2 is being closed while turning counterclockwise from the state shown in FIG. 4, the linkage lanyard 10 wrapped around the supporting shaft 11 is being paid out. As the linkage lanyard 10 is paid out, the wind-up gear 9 turns counterclockwise in FIG. 3 by the urging force of the second torsion spring 13, winding up the linkage lanyard 10 thereonto.

Incidentally, the urging force of the second torsion spring 13 is set to be weaker than that of the first torsion spring 7, but is set be stronger than the resistance force generated by the damper 8.

As the barrier 2 is further being closed, the linkage lanyard 10 is being paid out from the supporting shaft 11 in association with the pivotal motion of the barrier 2, and the wind-up gear 9 winds up the paid-out length of the linkage lanyard 10. When reaching the state shown in FIGS. 1 and 2, the barrier 2 is locked by the lock claw (not shown) and is stopped there.

As described above, in accordance with this embodiment, the barrier 2 is slowly opened in its opening operation and is then manually closed in its closing operation.

(Second Embodiment)

Figure 7:
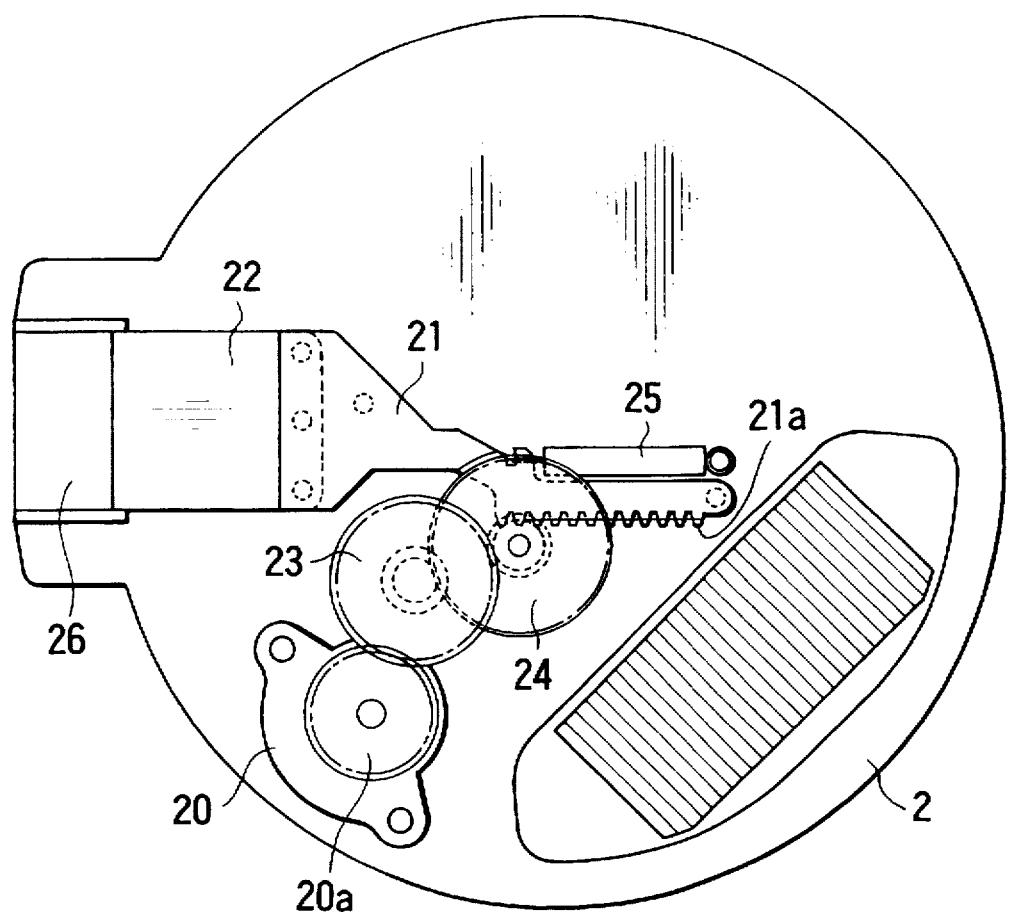
FIG. 7 is an internal view of a barrier (in its closed state) used in the camera according to a second embodiment of the present invention.
Figure 8:
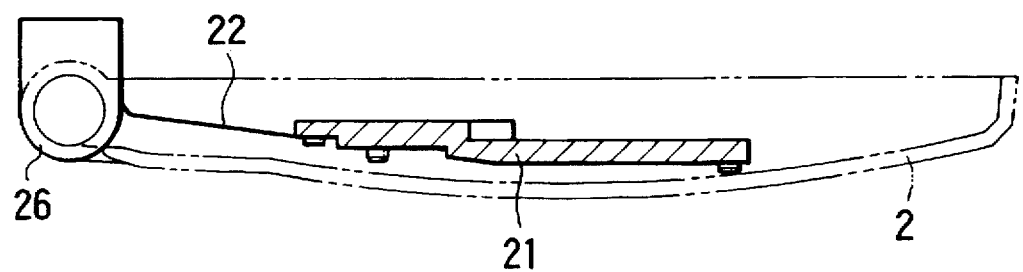
FIG. 8 is a cross-sectional view of the barrier (in its closed state).
Figure 9:
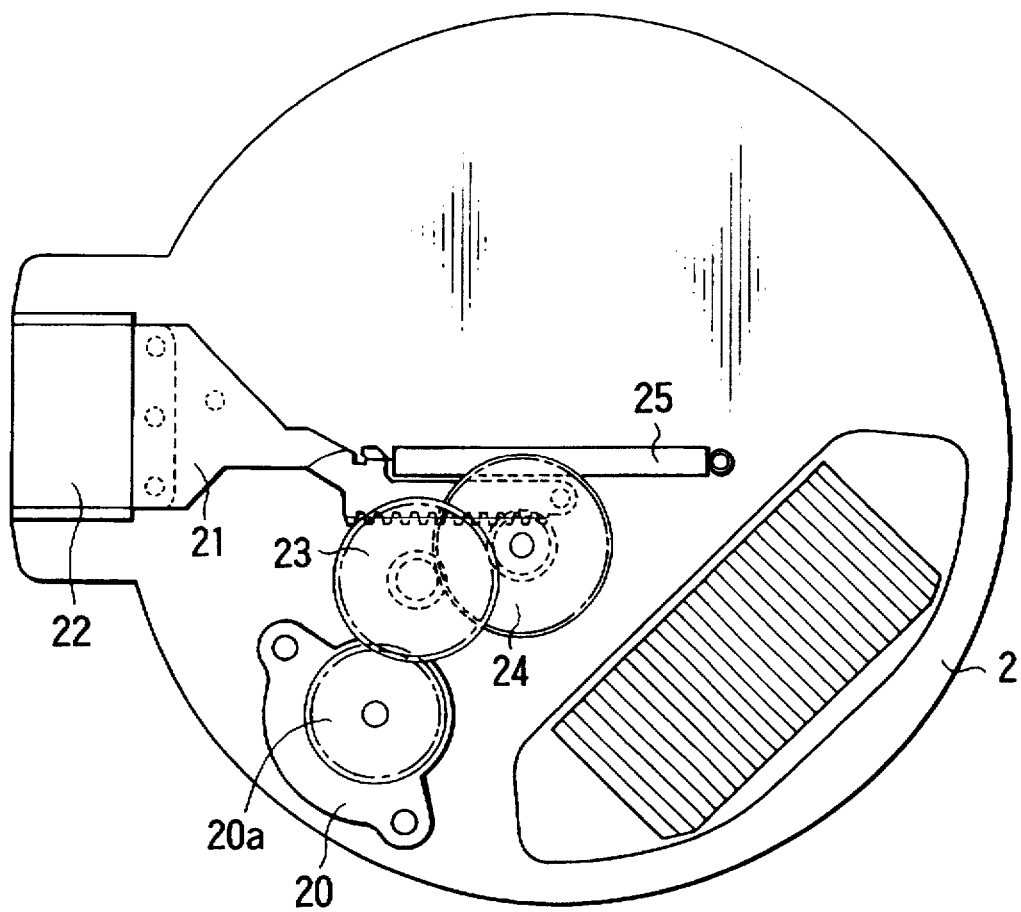
FIG. 9 is an enlarged, fragmentary internal view of the barrier (in its opened state).
Figure 10:
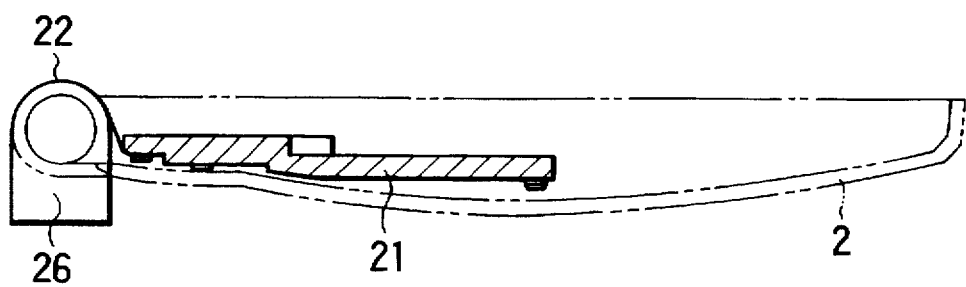
FIG. 10 is a cross-sectional view of the barrier (in its opened state).

FIGS. 7 through 10 show a camera according to a second embodiment of the present invention. FIGS. 7 and 8 show the barrier 2 in its closed state, and FIGS. 9 and 10 show the barrier 2 in its opened state. Reference numeral 26 denotes a supporting shaft secured to the camera body.

A damper 20 presents viscosity resistance to its gear portion 20a in its rotation. A linkage band 22 is fixed to one end of a rack 21. The rack 21 has on its other side a gear portion 21a.

Two-step gears 23 and 24 are interposed between the gear portion 21a of the rack 21 and the gear portion 20a of the damper 20 and are arranged to transmit rotation at an appropriate gear ratio.

A spring 25 urges the rack 21 to the right in FIG. 7, pulling the linkage band 22. The linkage band 22, which is made of a thin band-shaped flexible material, is capable of bending around the circumference of the supporting shaft 26.

In the camera constructed as described above, when the barrier 2 is unlocked, the barrier 2 is pivoted by the urging force of a spring (not shown) (equivalent to that in the first embodiment) clockwise in FIG. 8 from its closed state shown in FIGS. 7 and 8. Then, the linkage band 22 is wrapped around the supporting shaft 26, and the rack 21 moves to the left accordingly. Since the rack 21 is engaged with the damper 20 via the gears 24 and 23, the barrier 2 is slowly opened by receiving the viscosity resistance of the damper 20.

When, closing the barrier 2, the barrier 2 is manually pivoted counterclockwise in FIG. 8, and the linkage band 22 is paid out from the supporting shaft 26 and returns to its original position by being pulled by the spring 25.

(Third Embodiment)

Figure 19:
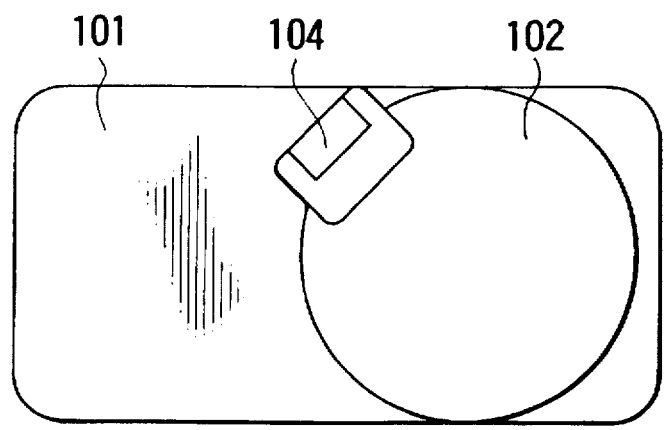
FIG. 19 is a front view of the camera (with the barrier closed).
Figure 20:
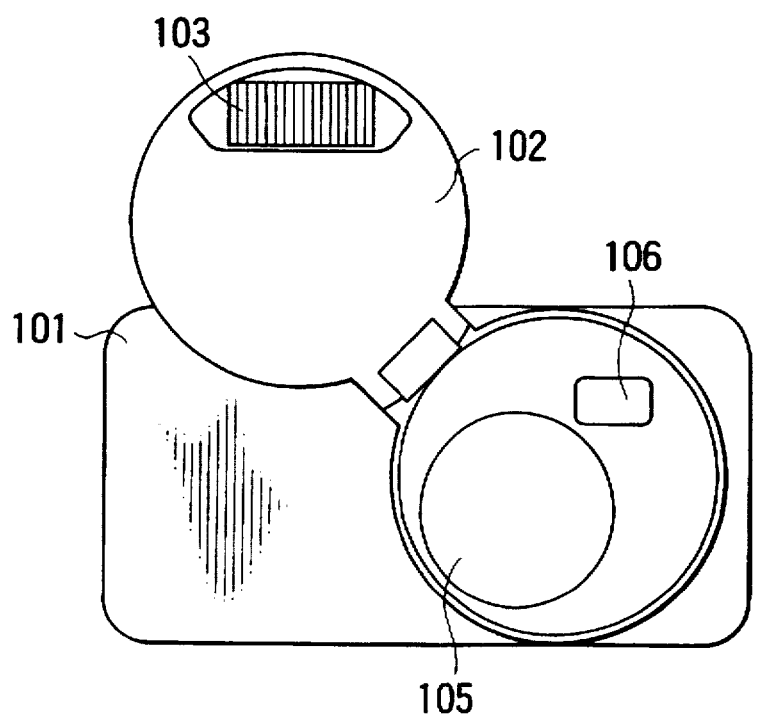
FIG. 20 is a front view of the camera (with the barrier opened).

FIGS. 19 and 20 show the appearance of a camera according to a third embodiment of the present invention. A camera body 101 is provided with a barrier 102 for protecting a photographing lens. The barrier 102 is pivotally supported at a hinge 104 to be opened or closed. The barrier 102 has on its rear side a flash emitting part 103. FIG. 19 shows the barrier 102 in its closed state, and FIG. 20 shows the barrier 102 in its opened state. The flash emitting part 103 is disposed apart as much as possible from the photographing lens with the barrier 102 opened so that the so-called red-eye phenomenon is mitigated.

Figure 11:
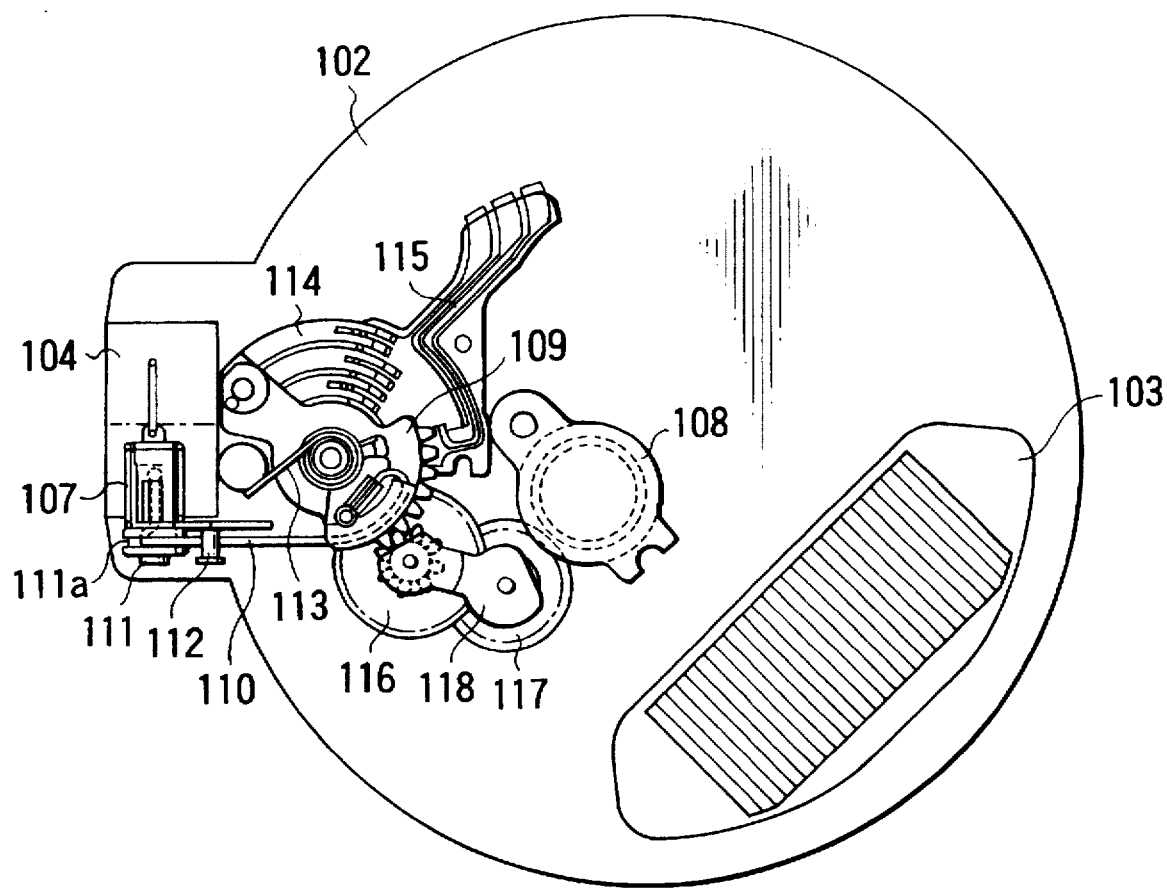
FIG. 11 is an internal view of a barrier (in its closed state) used in the camera according to a third embodiment of the present invention.

There are also shown a photographing lens unit 105 and a viewfinder 106. As shown in FIG. 11, the barrier 102 is constantly urged by a spring 107 in the direction of opening, and is locked by a known lock claw (not shown) in its closed state. When the camera is used, the lock claw is unlocked, allowing the barrier 102 to be opened by the urging force of the spring 107.

As is understood from FIGS. 19 and 20, the barrier 102 is relatively large for the size of the camera body 101. If the barrier 102 is of such a simple construction that the barrier 102 is opened by the urging force of the spring 107 alone, it may be flipped open too abruptly, possibly damaging the hinge 104. Even if it does not damage the hinge 104, such a flip motion degrades a sense of high quality and reliability required of a camera. On the other hand, the force required to close the barrier 102 is preferably as small as possible.

Figure 12:
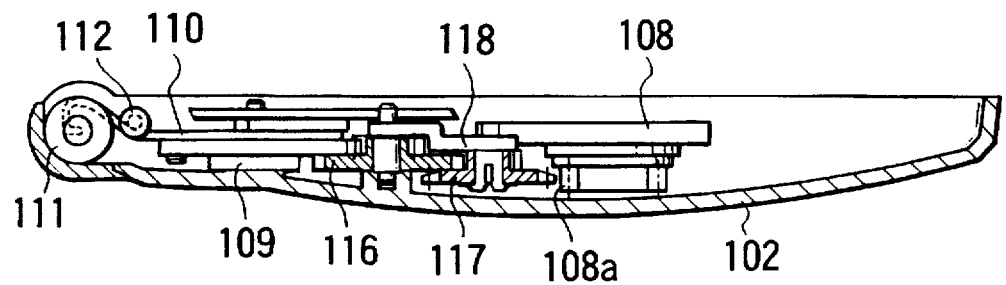
FIG. 12 is an expanded cross-sectional side view of the barrier (in its closed state).

Therefore, in this embodiment, the internal arrangement of the barrier 102 is constructed as shown in FIGS. 11 and 12. Referring to FIGS. 11 and 12, a damper 108 has a gear portion 108a, which is rotatable relative to a body of the damper 108. The body of the damper 108 accommodates a viscous material presenting a viscosity resistance to the rotation of the gear portion 108a.

One end of a linkage lanyard 110 is fixed to a wind-up gear 109. When the wind-up gear 109 turns counterclockwise in FIG. 11, the linkage lanyard 110 is wrapped around the wind-up gear 109, and when the wind-up gear 109 turns clockwise, the linkage lanyard 110 is paid out from the wind-up gear 109.

The hinge 104 has a supporting shaft 111, which is connected to the camera body 101. Attached around the circumference of the supporting shaft 111 is a torsion spring 107, which urges the barrier 102 in the direction of opening.

The supporting shaft 111 has on its end a guide groove 11a. The other end of the linkage lanyard 110 is routed along the groove 11a and fixed to the supporting shaft 111.

A guide roller 112 guides the linkage lanyard 110 straight to the wind-up gear 109 from the supporting shaft 111. A second torsion spring 113 urges the wind-up gear 109 counterclockwise in FIG. 11.

Contact pieces 114 which are attached to the gear 109 slide on a circuit board 115 secured on the barrier 102 while rotating together with the wind-up gear 109. The contact pieces 114 are used to detect the angle of rotation of the wind-up gear 109, namely, the opened or closed position of the barrier 102, through a circuit (not shown).

Reference numeral 116 denotes a two-step sun gear in a planetary gear mechanism. The small gear portion of the sun gear 116 is in mesh with the wind-up gear 109, and the large gear portion of the sun gear 116 is in mesh with a planet gear 117.

The planet gear 117 is also a two-step gear composed of a small gear portion and a large gear portion. The planet gear 117 is rotatably supported by an arm 118 which is rotatably supported at a rotary shaft of the sun gear 116.

Figure 13:
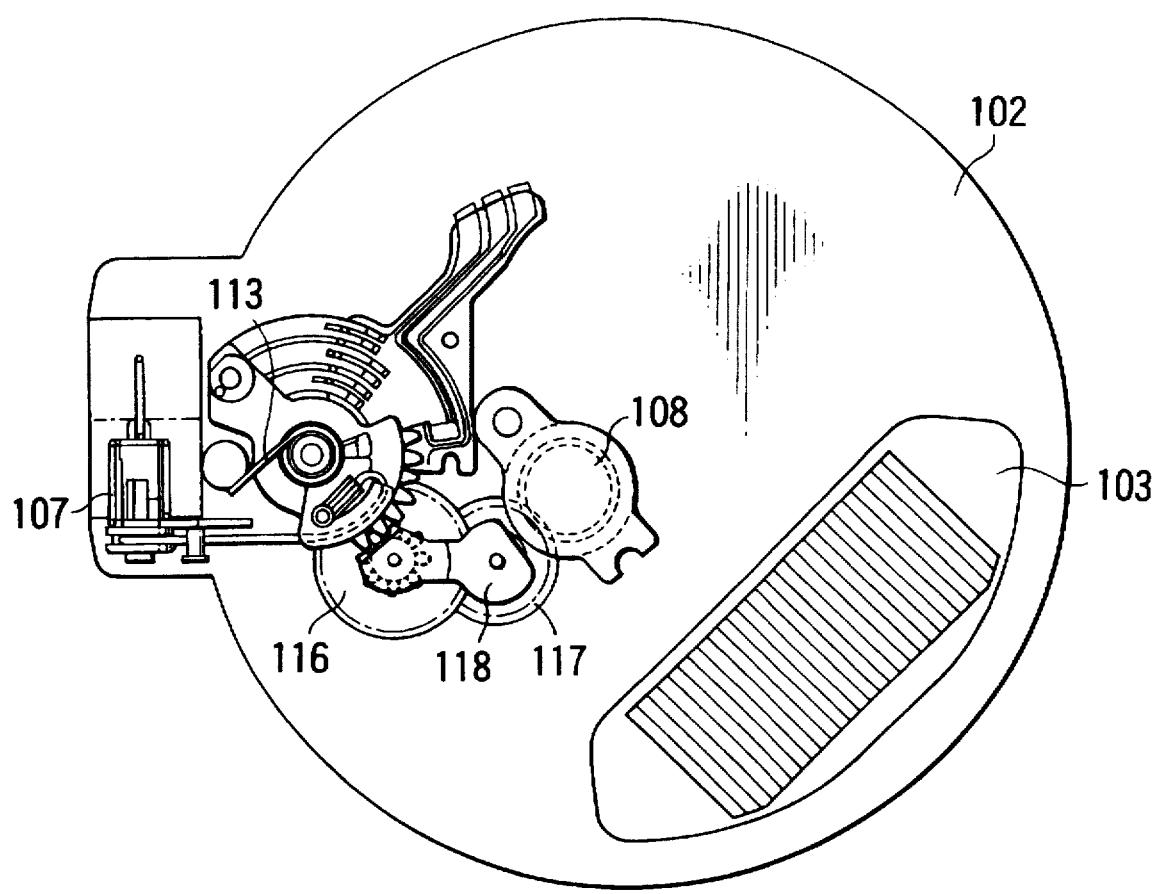
FIG. 13 is an internal view of the barrier (in process of starting to be fully opened).
Figure 15:
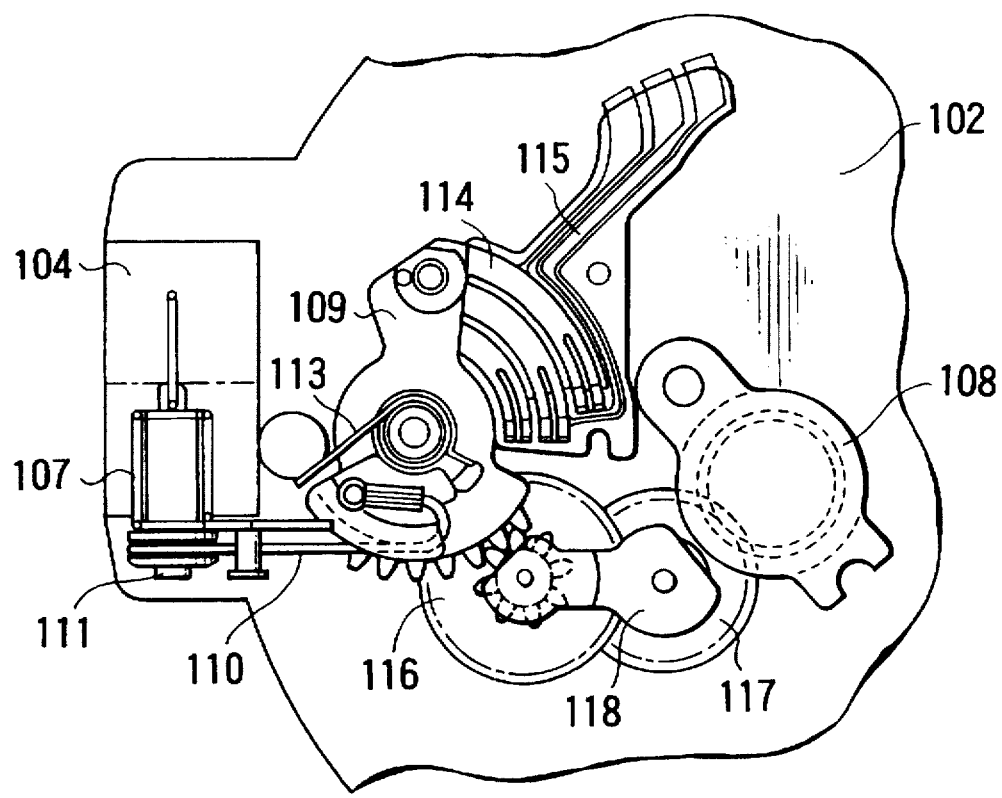
FIG. 15 is an enlarged, fragmentary internal view of the barrier (in its opened state).
Figure 17:
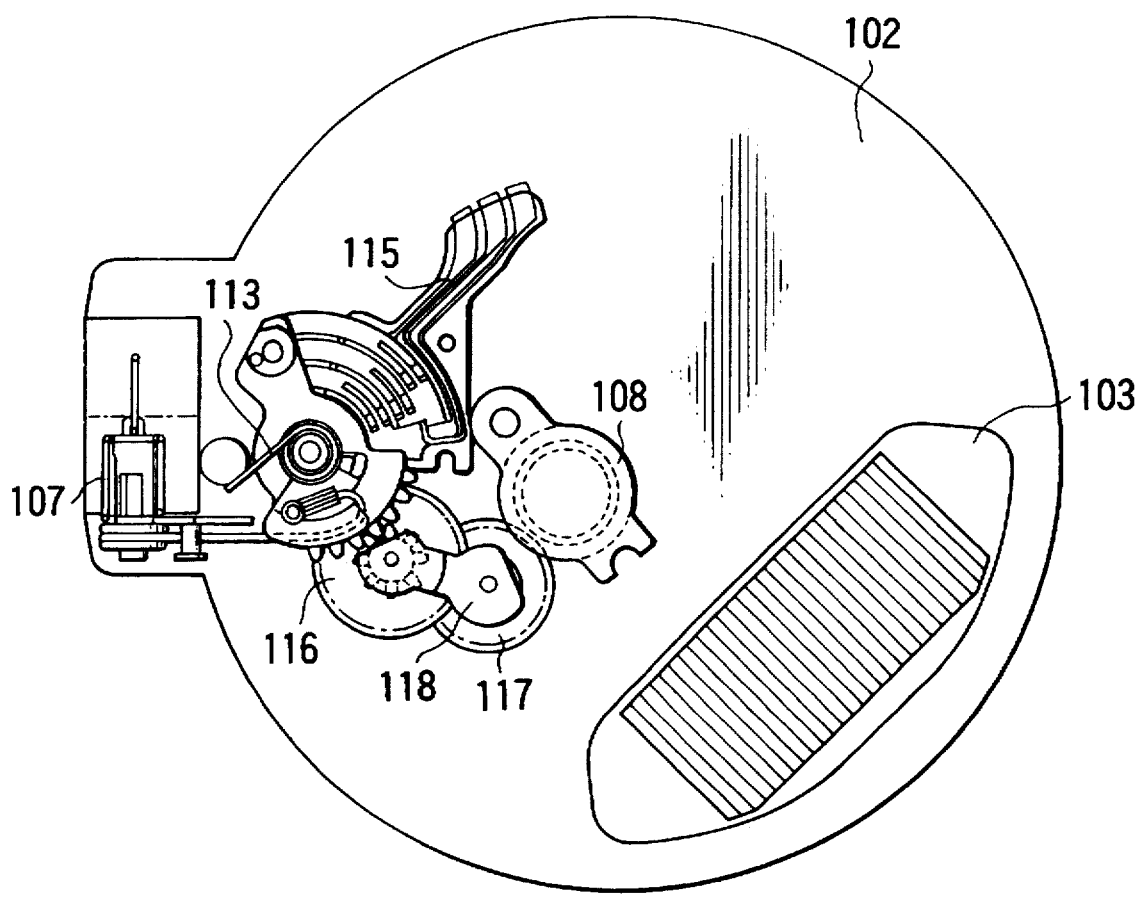
FIG. 17 is an internal view of the barrier (in its half-closed state).

A friction member (not shown) is interposed between the planet gear 117 and the arm 118 (or between the sun gear 116 and the arm 118), and along with the rotation of the sun gear 116, the arm 118 is pivoted. The planet gear 117 along with the arm 118 pivots between its engagement position with the gear portion 108a of the damper 108 (as shown in FIGS. 13 and 15) and its disengagement position with the gear portion 108a (as shown in FIGS. 11 and 17). The arm 118 abuts stoppers (not shown) at the engagement and disengagement positions, and is prevented from moving beyond these positions.

Both the sun gear 116 and the planet gear 117 transfer rotation of the wind-up gear 109 to the damper gear portion 108a at an increased speed. If viewed from the damper gear portion 108a, however, rotation is transferred at a reduced speed. Thus, in the course of transfer to the wind-up gear 109, viscosity resistance of the damper 108 is amplified. It is also possible to adjust resistance force to the wind-up gear 109 by changing the gear ratio of the gears 116 and 117 in accordance with the viscosity resistance of the damper 108.

Operation of the barrier mechanism constructed as described above is now discussed. In the closed state of the barrier 102 as shown in FIGS. 11 and 12, the linkage lanyard 110 is most wrapped around the wind-up gear 109 and its end is farthest apart from the supporting shaft 111. In this state, the planet gear 117 is at its disengagement position. In its closed position, the barrier 102 is locked by the lock claw (not shown). When the lock claw is unlocked with the camera switched on, the barrier 102 is pivoted clockwise in FIG. 12 from its closed state by the urging force of the spring 107 and is then opened. Incidentally, FIG. 12 is an expanded cross-sectional side view of the arrangement shown in FIG. 11.

Figure 14:
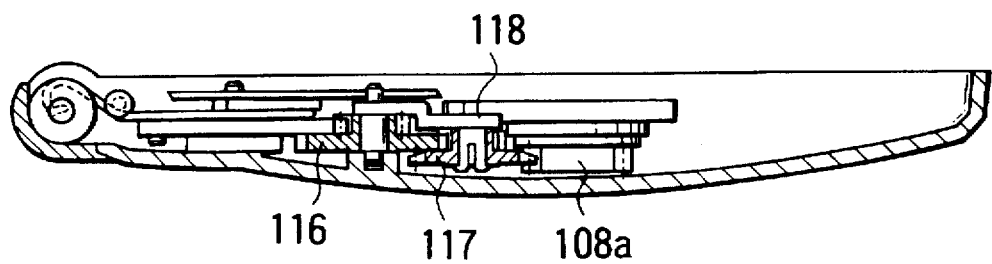
FIG. 14 is an expanded cross-sectional side view of the barrier (in process of starting to be fully opened).

The linkage lanyard 110 is being wrapped around the supporting shaft 111 as the pivotal motion of the barrier 102 is in progress. The wind-up gear 109 turns clockwise accordingly as shown in FIG. 11. With the wind-up gear 109 turning clockwise, the sun gear 116 turns counterclockwise. The planet gear 117 revolves counterclockwise about the sun gear 116 and reaches the engagement position shown in FIGS. 13 and 14. Incidentally, FIG. 14 is an expanded cross-sectional side view of the arrangement shown in FIG. 13.

Figure 16:
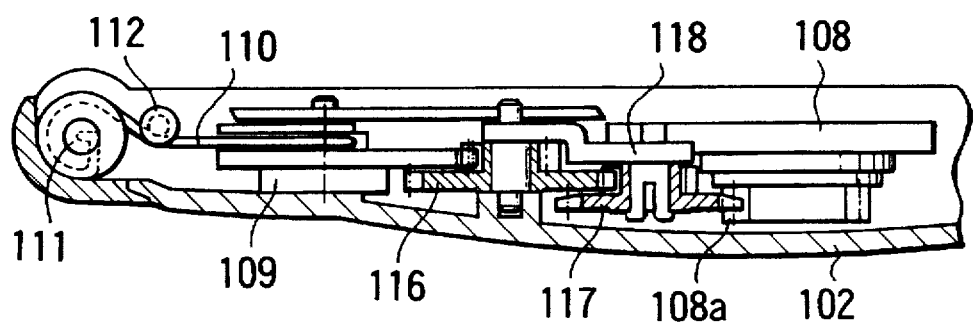
FIG. 16 is an expanded cross-sectional side view of the barrier (in its opened state).

The barrier 102 moves fast until the planet gear 117 reaches the engagement position. From the moment it reach the engagement position thereafter, the planet gear 117 moves slowly, because the viscosity resistance of the damper 108 is transferred to the wind-up gear 109. When the barrier 102 is opened 180° as shown in FIGS. 15 and 16, the barrier 102 is brought into abutment with the camera body 101 and stops there. The wind-up gear 109 is provided with a spring 113 which has a weaker force than the spring 107. Since the spring 113 urges the wind-up gear 109 counterclockwise, the resistance of the damper 108 as well as the urging force of the spring 113 works as a resistance when the barrier 102 is opened. Incidentally, FIG. 16 is an expanded cross-sectional side view of the arrangement shown in FIG. 15.

When the barrier 102 is pivoted counterclockwise in FIG. 16 and is closed by manually pressing the barrier 102 from its opened state against the urging force of the spring 107, the wind-up gear 109 turns counterclockwise in FIG. 15 under the urging force of the spring 113 and the linkage lanyard 110 is wrapped around the wind-up gear 109 (while being paid out from the supporting shaft 111).

Figure 18:
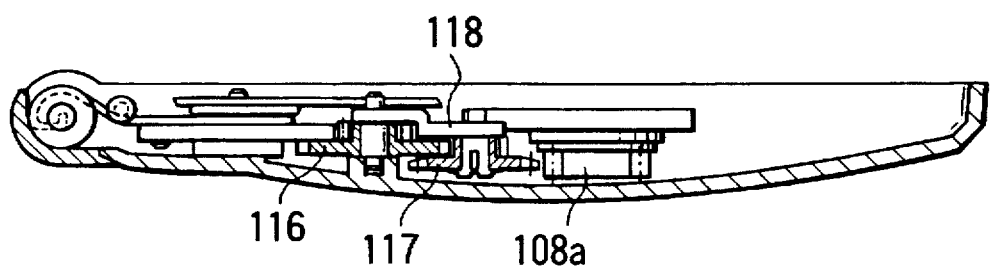
FIG. 18 is an expanded cross-sectional side view of the barrier (in its half-closed state).

With the wind-up gear 109 turning counterclockwise, the sun gear 116 turns clockwise, and the planet gear 117 revolves to its disengagement position. Then, the planet gear 117 is put out of mesh with the gear portion 108a of the damper 108, as shown in FIGS. 17 and 18. With the barrier 102 being closed, the planet gear 117 is out of mesh with the damper gear portion 108a without rotation of the damper 108. Since the viscosity resistance of the damper 108 does not work during the closing operation of the barrier 102, a force capable of overriding the urging force of the spring 107 is sufficient enough to manually close the barrier 102. Incidentally, FIG. 18 is an expanded cross-sectional side view of the arrangement shown in FIG. 17.

When the barrier 102 is closed to its fully closed position as shown in FIGS. 11 and 12, the linkage lanyard 110 is most wrapped around the wind-up gear 109, and is thus most paid out from the supporting shaft 111. The barrier 102 is thus locked.

In this embodiment, the engagement/disengagement of the planet gear 117 with the damper gear portion 108a is switched not only at both closed and opened positions of the barrier 102 but at any arbitrary midway position of the barrier 102 therebetween, and the planet gear 117 is engaged when the barrier 102 is pivoted in the direction of opening (clockwise in FIG. 12), and is disengaged when the barrier 102 is pivoted in the direction of closing (counterclockwise in FIG. 12). In the course of opening or closing operation, the barrier 102 may be manually lightly pressed in the direction of closing by hand. When the barrier 102 is opened by letting go of it, the resistance of the damper 108 works thereby slowly opening the barrier 102.

Since the linkage lanyard 110 is flexible as well as bendable to an arbitrary direction, it connects the supporting shaft 111 to the wind-up gear 109 in a very compact structure so that the pivotal motion of the barrier 102 is linked with the rotation of the wind-up gear 109.

In the embodiments described above, the movable unit is a barrier for protecting a lens. The movable unit in the present invention is not limited to such a barrier, and it may be a back cover or a cover member dedicated to a cartridge chamber.

Further, the damper and gears may be mounted on the camera body side rather than on the movable unit.

The present invention may be implemented in a diversity of cameras including single-lens reflex cameras, lens shutter cameras, and video cameras. The present invention may also be implemented in optical apparatuses other than cameras, non-optical apparatuses, or devices or elements adapted to the optical apparatuses other than cameras and the non-optical apparatuses.

The above-described embodiments, modifications, or their technical elements may be combined as required.

The present invention is not limited to the above-described embodiments. As long as the function presented by the arrangements to be defined in the appended claims or described in the above-described embodiments is carried out, any arrangement is perfectly acceptable.

As described above, according to the above-described embodiments, resistance is exerted by the use of resistance means against the opening and closing operations of the movable unit driven by the urging force of the spring, so that the movable unit moves slowly. The camera body is protected from damage arising from a flip motion of the movable unit, and a sense of high quality and reliability is not degraded.

A resistance generating member such as a damper is mounted on one of the camera body and the movable unit, and a linkage member such as the linkage lanyard or linkage band is used to connect the one of the camera body and the movable unit that bears the resistance generating member to the other of the camera body and the movable unit so as to construct resistance means. With such a simple construction, the above-described advantages are provided.

If the resistance generating member is mounted in an otherwise dead space in the movable unit, the resistance means is mounted in a compact size rather than increasing the size of the camera.

Gears or the like which transfer resistance generated in the resistance generating member at an amplified magnitude are interposed between the resistance generating member and the linkage member, and thus a small resistance generated in the resistance generating member works. A compact and lightweight design is thus implemented in the damper and the movable unit supporting the damper.

As a linkage member is of the flexible lanyard member or flexible band member which flexibly changes its form along with the opening or closing of the movable unit, the presence of the linkage member does not interfere with the motion of the movable unit when the movable unit is opened or closed relative to the camera body. Further, a compact design is implemented in the transfer path of resistance.

The present invention may be implemented in a lens protecting barrier (movable unit) having a flash emitting part. The barrier may be slowly moved to its open position, and the shifting of the projection range of the flash emitting part which would take place when the barrier is flipped open is assuredly prevented.

Further, according to the third embodiment in particular, resistance is exerted against the opening operation of the movable unit such as the lens protecting barrier driven by the urging force of the spring and no resistance is exerted against the closing operation of the movable unit when it is manually driven. The movable unit is slowly opened by the urging force of the spring so that the camera body is protected from being damaged and a sense of high quality is provided.

If a switching means for switching between engagement and disengagement of the connection member and the resistance generating member is automatically driven in accordance with the motion of the movable unit, the user is free from inconvenience involved in the operation of the switching means.

Furthermore, according to the third embodiment, a simple planetary gear mechanism is used as the switching means, and amplification capability is imparted to this mechanism. In this arrangement, even a small resistance generated by the resistance generating member works. A compact and lightweight design is thus implemented in the resistance generating member and the movable unit supporting the resistance generating member.

I claim:

1. A camera comprising:
    a cover movable relative to a camera body, for protecting a photographing system;
    urging means for urging said cover; and
    resistance means for exerting resistance to a movement of said cover caused by an urging force of said urging means, so that said cover moves slowly, said resistance means including a flexible member and a member around which said flexible member is wound.

2. A camera according to claim 1, wherein said resistance means comprises a resistance generating member mounted on one of said camera body and said cover, for generating the resistance, and a linkage member for connecting said resistance generating member to the other of said camera body and said cover.

3. A camera according to claim 2, wherein said resistance generating member is mounted on said cover.

4. A camera according to claim 2, wherein said resistance means further comprises resistance amplification means mounted between said resistance generating member and said linkage member, for transferring the resistance at an amplified magnitude.

5. A camera according to claim 2, wherein said linkage member is a member having flexibility.

6. A camera according to claim 5, wherein said linkage member is a lanyard-like member.

7. A camera according to claim 5, wherein said linkage member is a band-like member.

8. A camera according to claim 1, wherein said cover is pivotally supported by said camera body to be opened and closed.

9. A camera according to claim 1, wherein said cover has a flash emitting part for flash photography.

10. A camera according to claim 2, wherein said resistance generating member includes a damper having a viscosity resistance.

11. A camera according to claim 4, wherein said resistance amplification means includes a gear.

12. A camera according to claim 1, further comprising restraining means for restraining the resistance generated by said resistance means from acting on said cover.

13. A camera according to claim 12, wherein said restraining means includes switching means for switching between a first state where the resistance generated by said resistance means exerts a predetermined action on said cover and a second state where said predetermined action on said cover is restrained.

14. A camera according to claim 13, wherein said restraining means includes switching means for switching between a first state where the resistance generated by said resistance means exerts a predetermined action on said cover and a second state where said predetermined action on said cover is restrained.

15. A camera according to claim 13, wherein said switching means includes means for shifting to the second state when said cover moves against the urging force of said urging means.

16. A camera according to claim 12, wherein said restraining means includes means for bringing about a state where the resistance does not act on said cover.

17. A camera comprising:

a flash emitting part movable relative to a camera body, for flash photography;

urging means for urging said flash emitting part; and resistance means for exerting resistance to a movement of said flash emitting part caused by an urging force of said urging means, so that said flash emitting part moves slowly, said resistance means including a flexible member and a member around which said flexible member is wound.

18. A camera comprising:

a cover for covering a photographing optical system, switchable to a covering state or a non-covering state;

urging means for urging said cover;

resistance means for exerting resistance to a movement of said cover caused by an urging force of said urging means, so that said cover moves slowly; and restraining means for restraining the resistance means from acting on said cover.

19. A camera according to claim 18, wherein said restraining means includes switching means for switching between a first state where the resistance generated by said resistance means exerts a predetermined action on said cover and a second state where said predetermined action on said cover is restrained.

20. A camera according to claim 19, wherein said restraining means includes switching means for switching between a first state where the resistance generated by said resistance means exerts a predetermined action on said cover and a second state where said predetermined action on said cover is restrained.

21. A camera according to claim 19, wherein said switching means includes means for shifting to the second state when said cover moves against the urging force of said urging means.

22. A camera according to claim 18, wherein said restraining means includes means for bringing about a state where the resistance does not act on said cover.

23. A camera according to claim 18, where said restraining means includes means for restraining the resistance means from acting on said cover by changing a transfer state of transfer means for transferring the resistance generated by said resistance means to said cover.

24. A camera according to claim 23, wherein said transfer means includes means for switching between a first state where the resistance generated by said resistance means is transferred to said cover and a second state where the resistance is not transferred to said cover.

25. A camera according to claim 23, wherein said transfer means includes a gear.

26. A camera according to claim 25, wherein said transfer means includes a sun gear and a planet gear, and, in accordance with a direction of movement of said sun gear, switches between a state where said planet gear is in mesh with a predetermined gear other than said sun gear and a state where said planet gear is not in mesh with said predetermined gear.

27. A camera according to claim 18, wherein said cover includes a flash emitting part for flash photography.

28. A camera according to claim 18, wherein said cover is pivotally supported by said camera body.

29. A camera according to claim 19, wherein said switching means includes means for selecting the first state when said cover is shifted from a closed state to an opened state and selecting the second state when said cover is shifted from the opened state to the closed state.

30. A camera according to claim 19, wherein said cover includes a flash emitting part for flash photography which is capable of being located at a first position and a second position spaced more apart from a photographing optical system than the first position, and wherein said switching means includes means for setting the first state when said flash emitting part is shifted from the first position to the second position and setting the second state when said flash emitting part is shifted from the second position to the first position.

31. A camera comprising:

a movable flash emitting part for flash photography;

urging means for urging said movable flash emitting part;

resistance means for exerting resistance to a movement of said movable flash emitting part caused by an urging force of said urging means, so that said movable flash emitting part moves slowly; and restraining means for restraining the resistance means from acting on said movable flash emitting part.

32. A camera comprising:

a cover movable relative to a camera body, for protecting a photographing system;

urging means for urging said cover; and resistance means for exerting resistance to a movement of said cover caused by an urging force of said urging means, so that said cover moves slowly, said resistance means including a lanyard-like linkage member.

33. A camera comprising:

a cover movable relative to a camera body, for protecting a photographing system;

urging means for urging said cover; and resistance means for exerting resistance to a movement of said cover caused by an urging force of said urging means, so that said cover moves slowly, said resistance means including a bandlike linkage member.

* * * * *

UNITED STATES PATENT AND TRADEMARK OFFICE
CERTIFICATE OF CORRECTION

PATENT NO. : 5,794,084
DATED : August 11, 1998
INVENTOR(S) : Hideo Ikari

It is certified that error appears in the above-identified patent and that said Letters Patent is hereby corrected as shown below:

Col. 2, line 52, delete "emit ting" and insert --emitting--

Col. 2, line 59, delete "photo graphing" and insert --photographing--.

Col. 5, line 48, delete "11a" and insert --111a--.

Col. 5, line 50, delete "11a" and insert --111a--.

Signed and Sealed this

Second Day of February, 1999

Attest:

Attesting Officer

Acting Commissioner of Patents and Trademarks